UNITED STATES PATENT OFFICE.

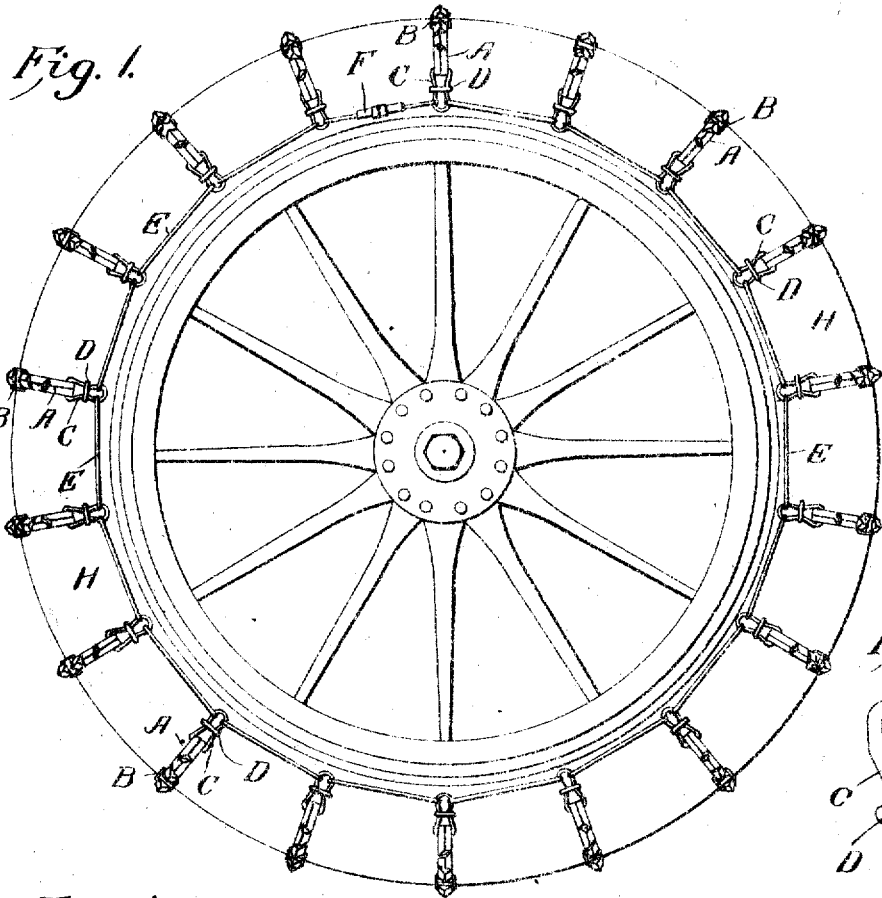
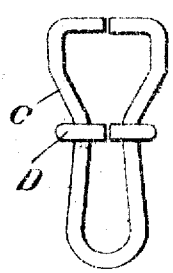
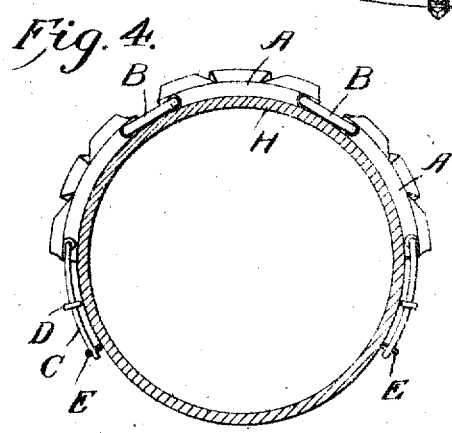
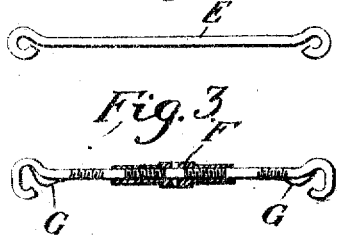
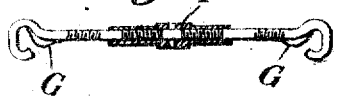

EDWIN J. WILLIAMS, OF SALT LAKE CITY, UTAH.

VEHICLE-TIRE GRIP.

No. 917,228.

Specification of Letters Patent.

Patented April 6, 1909.

Application filed February 15, 1908. Serial No. 416,098.

*To all whom it may concern:*

Be it known that I, EDWIN J. WILLIAMS, a citizen of the United States, residing at Salt Lake City, in the county of Salt Lake and State of Utah, have invented certain new and useful Improvements in Vehicle-Tire Grips, of which the following is a specification.

The purpose of my invention is to provide an appliance that can be quickly and firmly secured on the outer surface of a vehicle tire of the pneumatic type, that will prevent horizontal or lateral sliding of said vehicle, and that will present a neat appearance.

I accomplish this by the device illustrated in the accompanying drawings, in which—

Figure 1 is a side elevation of a vehicle wheel and inflated tire, with my invention applied thereon. Fig. 2 is a view of one of the sections of the wire band. Fig. 3 is a section view of the severed section of the wire band, showing the threaded nut F. Fig. 4 is a transverse section of the tire with the device in place. Fig. 5 is a side view of one of the links joining the bands and calks.

On opposite sides of the inflated pneumatic tire H, of the vehicle, are placed two attaching members, made in sections E, alike in shape and construction, except the adjusting or tightening section, that is severed near the middle, and one end threaded with the left hand threads, and the other with right hand threads, and made to engage the nut F, one part of which is threaded to the left, and the other to the right, and that is also provided with transverse openings therethrough for convenience in turning the nut. Spring members G at the ends of the sections connected with F, as shown in Fig. 3, prevent parting of the attaching members at the connected ends thereof should the tire become flat. The sections E, are joined by one end of the link C, the other end of which is inserted through one end of the calk A. All of the calks are made slightly concave on the inner side, the concavity being the same as the convexity of the outer part of the tire H, to which it is closely fitted. A sufficient number of said calks A are linked together by links B, to partially encircle the tire, and connect by another link, C, to the other attaching member. A similar string of calks is provided for each of the sections, E, and closely held to the tread of the tire by tightening of the attaching members by means of the threads and nut F. The links C, are held in the hole in the calks A by means of the clasp D. The outer portion of the calks A, are corrugated or roughened, and may be made of any strong or durable material, preferably hardened steel.

By means of the right and left hand screws, one on each side of the grip, as heretofore described, the same can be, and is easily so tightened as to prevent the grip from hanging loosely on the tire, so that the grip fits snugly on the tire, and presents a neat and attractive appearance to the eye. There will thus be no damage done to the tire by the sliding or slipping of the same on the tire.

Having thus described my invention, I desire to secure Letters Patent and claim:

The combination with a wheel and its tire, of a grip therefor comprising a series of sets of calks, each set comprising a plurality of calks of the same shape and construction connected each to each by pivoted links, each calk being curved to conform to the transverse curvature of the tire and having a serrated outer edge, terminal links at the ends of each set of calks, each terminal link being pivoted to its adjacent calk and having a keeper thereon intermediate of its ends to prevent spreading thereof and displacement from its calk, and means to adjustably secure the sets of calks to the tire, such means including attaching members secured to the outer ends of said terminal links.

In testimony whereof I affix my signature in presence of two witnesses.

EDWIN J. WILLIAMS.

Witnesses:
A. H. CUTRIGHT,
JOS F. SIMMONS.